United States Patent
Yokoyama et al.

(10) Patent No.: US 8,451,267 B2
(45) Date of Patent: May 28, 2013

(54) PIPE INSTALLATION SUPPORT APPARATUS

(75) Inventors: Hiroshi Yokoyama, Tokyo (JP);
Toshiyuki Yamagata, Tokyo (JP);
Shinichi Ebata, Tokyo (JP); Kazuo Narita, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 782 days.

(21) Appl. No.: 12/634,956

(22) Filed: Dec. 10, 2009

(65) Prior Publication Data
US 2010/0149178 A1    Jun. 17, 2010

(30) Foreign Application Priority Data

Dec. 12, 2008  (JP) ................................ 2008-317388
Dec. 12, 2008  (JP) ................................ 2008-317389

(51) Int. Cl.
*G06T 17/00* (2006.01)
*F16T 55/00* (2006.01)

(52) U.S. Cl.
USPC ............ 345/419; 345/619; 345/473; 138/97; 138/98

(58) Field of Classification Search
USPC .................. 345/419, 619; 285/18; 138/97, 98
See application file for complete search history.

(56) References Cited

U.S. PATENT DOCUMENTS

| | | | |
|---|---|---|---|
| 6,330,523 B1 * | 12/2001 | Kacyra et al. | 702/159 |
| 6,405,095 B1 * | 6/2002 | Jang et al. | 700/118 |
| 6,573,903 B2 * | 6/2003 | Gantt | 345/619 |
| 7,173,622 B1 * | 2/2007 | McLaughlin | 345/473 |
| 2006/0044307 A1 * | 3/2006 | Song | 345/419 |

FOREIGN PATENT DOCUMENTS

| | | |
|---|---|---|
| JP | 1-203915 | 8/1989 |
| JP | 9-311883 | 12/1997 |
| JP | 10-293776 | 11/1998 |
| JP | 2002-228044 | 8/2002 |
| JP | 2002-236711 | 8/2002 |
| JP | 2006-277405 | 10/2006 |

OTHER PUBLICATIONS

Search-Result.*
Searc-Result2.*
Search-Result3.*
Search-Result4.*

* cited by examiner

*Primary Examiner* — Kimbinh T Nguyen
(74) *Attorney, Agent, or Firm* — Antonelli, Terry, Stout & Kraus, LLP.

(57) ABSTRACT

A pipe installation support apparatus includes: a display control device for displaying images of pipes already installed and a pipe to be attached on a display device; an input device for inputting a movement instruction to move or rotate at least one of the image of the pipes; and a moving device for translating or rotating at least one of three-dimensional data of the pipes already installed and the three-dimensional data of the pipe to be attached based on the movement instruction when the movement instruction is input from the input device, wherein when the moving device translates or rotates the three-dimensional data, the display control device moves the images of the pipes already installed and the pipe to be attached displayed on the display device.

15 Claims, 13 Drawing Sheets

PIPE INSTALLATION SUPPORT APPARATUS

CROSS-REFERENCE TO RELATED APPLICATIONS

This application claims the priority benefit under 35 U.S.C. §119 of Japanese Patent Application No. 2008-317388 filed on Dec. 12, 2008 and Japanese Patent Application No. 2008-317389 filed on Dec. 12, 2008, which is hereby incorporated in its entirety by reference.

BACKGROUND OF THE INVENTION

1. Field of the Invention

The presently disclosed subject matter relates to a pipe installation support apparatus, and more particularly, to a pipe installation support apparatus which supports installation of a pipe which connects pipes that have already been installed in a facility.

2. Description of the Related Art

A pipe (referred to as pipe to be attached below) which connects pipes (referred to as pipes already installed below) that have already been installed in a facility is manufactured to have a greater length than that including a machining allowance in design data. Therefore, to install the pipe to be attached, there is generally employed a method of actually holding up the pipe to be attached in a facility with two pipes already installed, and checking an interference state between the pipes already installed and the pipe to be attached or investigating a machining amount of the pipe to be attached.

Other than the method of actually holding up the pipe to be attached, there is a method which mainly utilizes human skills. In the method, the end face shapes of the pipes already installed and the pipe to be attached are measured by use of a three-dimensional measuring device, and a measurer instructs a machining amount based on the measurement result and his or her experience.

As a similar technique, Japanese Patent Application Laid-Open No. 2002-236711 discloses a technique for checking the presence or absence of interference between an additional part and a pipe already installed or the like on CAD at the time of adding the part in plant product designing. Also, Japanese Patent Application Laid-Open No. 2006-277405 discloses a method of investigating the shape of a pipe section.

SUMMARY OF THE INVENTION

However, in the method of actually holding up the pipe to be attached which has been generally performed, it takes much energy to hold up the pipe due to the weight of the pipe or the like. Thus, there is a problem that it is difficult to hold up the pipe, check the interference, instruct the machining amount or the like a plurality of times, and it is not possible to investigate the interference and the machining amount in detail.

Also, an operator needs to have much actual accomplishment in the field enough to be able to give a machining instruction in order to investigate the interference between actual objects in the method of actually holding up the pipe to be attached and instruct the machining amount based on the analysis of numerical information (three-dimensional coordinate data) measured by the three-dimensional measuring device, and thus cannot easily give the machining instruction. Also, a less experienced operator may not be able to make a right decision. There is also a problem that an operator cannot visually check the pipe interference state.

In the inventions described in Japanese Patent Application Laid-Open Nos. 2002-236711 and 2006-277405, the CAD data used for investigating the pipe interference is created at the time of design, that is, created without reflecting a field situation. Thus, there is a problem that the CAD data cannot be used for investigating the interference of the pipe supplied to the field with the machining allowance being included in consideration of the field situation in advance.

The presently disclosed subject matter has been made in view of such circumstances, and it is an object of the presently disclosed subject matter to provide a pipe installation support apparatus which can investigate an interference state between pipes and a machining amount thereof when a pipe to be attached is installed based on data that reproduces an actual pipe state.

In order to achieve the above object, a pipe installation support apparatus according to a first aspect of the presently disclosed subject matter includes: an acquiring device which acquires, as point group data that is a group of point information, a three-dimensional measurement result regarding shapes of an end face of each of two pipes already installed in a facility and a section at any position of a linear portion adjacent to the end face, and shapes of an end face of a pipe to be attached that connects the two pipes already installed and a section of a pipe linear portion adjacent to the end face; a three-dimensional data generating device which generates three-dimensional data including the shape of the end face and a direction of an axis with respect to each of the pipes already installed and the pipe to be attached based on the point group data acquired by the acquiring device; an automatic locating device which locates the three-dimensional data of the pipes already installed and the pipe to be attached at a position where the pipe to be attached most appropriately connects the two pipes already installed based on the direction of the axis of each of the pipes already installed and the direction of the axis of the pipe to be attached; a machining amount calculating device which calculates a length of an interference portion between the three-dimensional data of each of the pipes already installed and the three-dimensional data of the pipe to be attached as a machining amount of the pipe to be attached in a state in which the three-dimensional data of the pipes already installed and the pipe to be attached are located by the automatic locating device; and an output device which outputs the machining amount calculated by the machining amount calculating device to at least one of a display device and an external device.

With the pipe installation support apparatus according to the first aspect, the three-dimensional measurement result regarding the shapes of the end face of each of the two pipes already installed in the facility and the section at any position of the linear portion adjacent to the end face, and the shapes of the end face of the pipe to be attached that connects the two pipes already installed and the section of the pipe linear portion adjacent to the end face is acquired as the point group data that is the group of point information. The three-dimensional data including the shape of the end face and the direction of the axis is generated with respect to each of the pipes already installed and the pipe to be attached based on the point group data. The three-dimensional data of the pipes already installed and the pipe to be attached are located at the position where the pipe to be attached most appropriately connects the two pipes already installed based on the direction of the axis of each of the pipes already installed and the direction of the axis of the pipe to be attached. The length of the interference portion between the three-dimensional data of each of the pipes already installed and the three-dimensional data of the pipe to be attached is calculated as the machining amount of the pipe to be attached. The machining amount is output to at least one of the display device and the external device. Accordingly, pipe installation support, such as giving an instruction to machine the pipe in a field, can be provided without having to perform an operation of holding up the pipe. Also, since the three-dimensional data of the pipes already installed and the pipe to be attached are located at the position where the pipe to be attached most appropriately connects the two pipes already installed, an appropriate machining amount can be calculated even when an operator with no experience performs an operation.

A pipe installation support apparatus according to a second aspect of the presently disclosed subject matter is the pipe installation support apparatus according to the first aspect, wherein the three-dimensional data generating device calculates the direction of the axis based on the shapes of the end face and the section of the pipe linear portion adjacent to the end face.

With the pipe installation support apparatus according to the second aspect, the direction of the axis is calculated based the shapes of the end face and the section of the pipe linear portion adjacent to the end face. Accordingly, even when the end face is cut at a slant with respect to the pipe, the direction of the axis can be accurately calculated.

A pipe installation support apparatus according to a third aspect of the presently disclosed subject matter is the pipe installation support apparatus according to the first or second aspect, wherein the three-dimensional data generating device generates substantially circular data by connecting the point group data on each of the shape of the end face of each of the pipes already installed and the shape of the end face of the pipe to be attached, and locates an evaluation point on a circumference of each of the generated substantially circular data, and the machining amount calculating device calculates, as the machining amount, a distance between the evaluation point located on the circumference of the substantially circular data generated by connecting the point group data on the shape of the end face of each of the pipes already installed, and the evaluation point located on the circumference of the substantially circular data generated by connecting the point group data on the shape of the end face of the pipe to be attached.

With the pipe installation support apparatus according to the third aspect, the substantially circular data is generated by connecting the point group data on each of the shape of the end face of each of the pipes already installed and the shape of the end face of the pipe to be attached, and the evaluation point is located on the circumference of each of the generated substantially circular data. The distance between the evaluation points is calculated as the machining amount. Accordingly, the machining amount can be easily calculated.

A pipe installation support apparatus according to a fourth aspect of the presently disclosed subject matter is the pipe installation support apparatus according to any one of the first to third aspects, wherein the automatic locating device includes a determining device which determines that the three-dimensional data of the pipes already installed and the pipe to be attached are located at the position where the pipe to be attached most appropriately connects the two pipes already installed in a case where the axis of the pipe to be attached and the axes of the two pipes already installed are substantially aligned with each other when a point where the end face of one of the pipes already installed intersects with the axis of the pipe already installed, and a point where a desired end face of the pipe to be attached intersects with the axis of the pipe to be attached are aligned with each other.

With the pipe installation support apparatus according to the fourth aspect, the case where the axis of the pipe to be attached and the axes of the two pipes already installed are substantially aligned with each other (for example, a case where the axes are misaligned by a few mm or less) when the point where the end face of one of the pipes already installed intersects with the axis of the pipe already installed, and the point where the desired end face of the pipe to be attached intersects with the axis of the pipe to be attached are aligned with each other can be determined as the position where the pipe to be attached most appropriately connects the two pipes already installed.

A pipe installation support apparatus according to a fifth aspect of the presently disclosed subject matter is the pipe installation support apparatus according to any one of the first to fourth aspects, wherein the automatic locating device includes a determining device which determines that the three-dimensional data of the pipes already installed and the pipe to be attached are located at the position where the pipe to be attached most appropriately connects the two pipes already installed in a case where the axis of the pipe to be attached intersects with each of the axes of the two pipes already installed when a point where the end face of one of the pipes already installed intersects with the axis of the pipe already installed, and a point where a desired end face of the pipe to be attached intersects with the axis of the pipe to be attached are aligned with each other.

With the pipe installation support apparatus according to the fifth aspect, the case where the axis of the pipe to be attached intersects with each of the axes of the two pipes already installed when the point where the end face of one of the pipes already installed intersects with the axis of the pipe already installed, and the point where the desired end face of the pipe to be attached intersects with the axis of the pipe to be attached are aligned with each other can be determined as the position where the pipe to be attached most appropriately connects the two pipes already installed.

A pipe installation support apparatus according to a sixth aspect of the presently disclosed subject matter is the pipe installation support apparatus according to the fourth or fifth aspect, wherein the automatic locating device includes: a moving device which translates the three-dimensional data of the pipes already installed and/or the three-dimensional data of the pipe to be attached by any distance, or rotates the three-dimensional data of the pipes already installed and/or the three-dimensional data of the pipe to be attached by any angle; and a control device which controls the moving device to translate or rotate the three-dimensional data of the pipes already installed and/or the three-dimensional data of the pipe to be attached when the determining device determines that the three-dimensional data of the pipes already installed and the pipe to be attached are not located at the position where the pipe to be attached most appropriately connects the two pipes already installed.

With the pipe installation support apparatus according to the sixth aspect, when it is determined that the three-dimensional data of the pipes already installed and the pipe to be attached are not located at the position where the pipe to be attached most appropriately connects the two pipes already installed, the three-dimensional data of the pipes already installed and/or the three-dimensional data of the pipe to be attached are translated by any distance or rotated by any angle. Accordingly, the three-dimensional data of the pipes already installed and the pipe to be attached can be automatically located at the position where the pipe to be attached most appropriately connects the two pipes already installed.

A pipe installation support apparatus according to a seventh aspect of the presently disclosed subject matter is the pipe installation support apparatus according to the sixth aspect, wherein the acquiring device acquires a relative positional relationship between both ends of the pipe to be attached, the three-dimensional data generating device locates the three-dimensional data including the shapes of the end faces at both ends of the pipe to be attached and the direction of the axis by reproducing the acquired relative positional relationship between both ends, and the moving device integrally translates or rotates the three-dimensional data of both ends of the pipe to be attached located by reproducing the relative positional relationship between both ends.

With the pipe installation support apparatus according to the seventh aspect, the three-dimensional data of both ends of the pipe to be attached are translated or rotated while the relative positional relationship between both ends of the pipe to be attached is being maintained. Accordingly, the pipe installation position can be investigated while the positional relationship between both ends of the pipe is being maintained.

With the presently disclosed subject matter, the interference state between the pipes and the machining amount thereof when the pipe to be attached is installed can be investigated based on the data that reproduces the actual pipe state.

BRIEF DESCRIPTION OF THE DRAWINGS

FIG. 9A illustrates a state in which the investigation process is started; FIG. 9B illustrates a state in which the pipe to be attached is translated and rotated from the state shown in FIG. 9A; and FIG. 9C illustrates a state in which the pipe to be attached is rotated from the state shown in FIG. 9B;

DETAILED DESCRIPTION OF THE PREFERRED EMBODIMENT(S)

Figure 1:
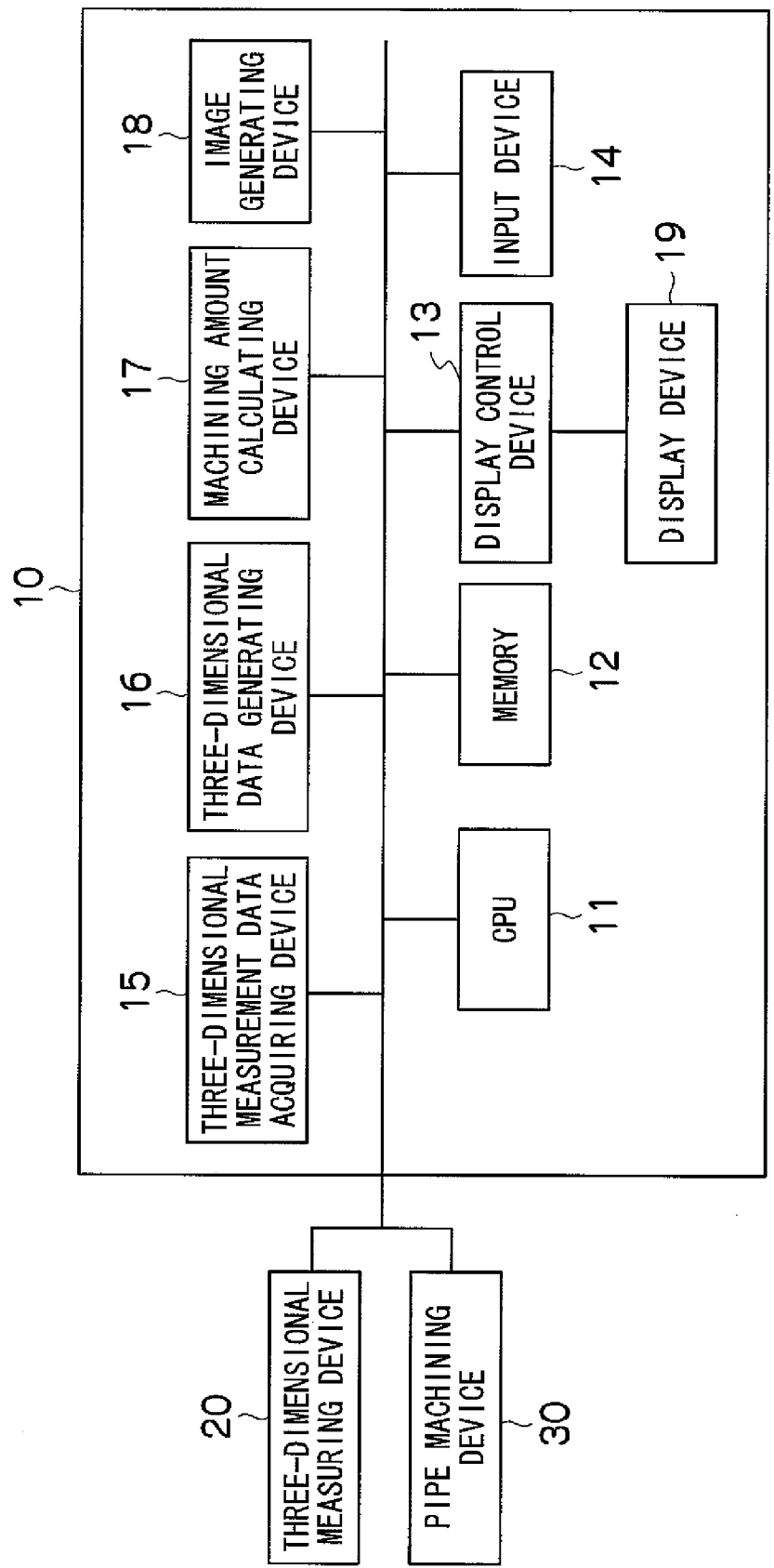
FIG. 1 is a block diagram illustrating a pipe installation support apparatus 1 according to a first embodiment.

In the following, a preferred embodiment of a pipe installation support apparatus according to the presently disclosed subject matter will be described with reference to the accompanying drawings.

A pipe installation support apparatus 1 mainly includes a three-dimensional CAD (Computer aided design system) apparatus 10, a noncontact three-dimensional measuring device 20 which emits a laser beam or the like to a three-dimensional object to measure its shape and position in three dimensions, and a pipe machining device 30 which cuts off the distal end of a pipe to be attached or the like.

The three-dimensional CAD apparatus 10 mainly includes a CPU (central processing unit) 11, a memory 12, a display control device 13, an input device 14, a three-dimensional measurement data acquiring device 15, a three-dimensional data generating device 16, a machining amount calculating device 17, an image generating device 18, and a display device 19.

The CPU 11 is connected to each block in the three-dimensional CAD apparatus 10 via a bus to control the operation of each block. The CPU 11 also exchanges data between the three-dimensional CAD apparatus 10, and the three-dimensional measuring device 20 and the pipe machining device 30.

The memory 12 includes a storage area which stores a control program, various application softwares or the like, and a work area for program execution.

The display control device 13 selects an image to be displayed on the display device 19 from images generated by the image generating device 18, and displays the image on the display device 19. The display device 19 includes a CRT (cathode ray tube) monitor or a liquid crystal display monitor, for example.

The input device 14 includes a keyboard and a mouse. The input device 14 receives an operation input from an operator, and inputs a signal according to the operation input to the CPU 11. A touch panel, a touch pad or the like may be also used as a pointing device in addition to the mouse.

Figure 2:
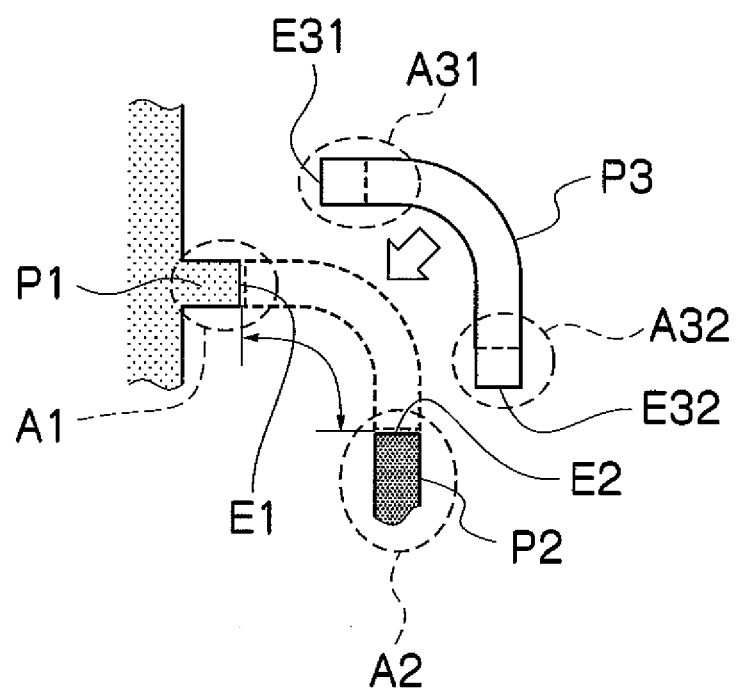
FIG. 2 is a view illustrating a state in which interference between pipes needs to be checked.

The three-dimensional measurement data acquiring device 15 acquires measurement data on the shape and position of an end face and the shape and position of a section at any position of a linear portion of a pipe adjacent to the end face with respect to each of pipes already installed and a pipe to be attached from the three-dimensional measuring device 20 as shown in FIG. 2. In FIG. 2, the pipes already installed are denoted by P1 and P2, and the pipe to be attached is denoted by P3. The end faces of the pipes P1 and P2 are denoted by E1 and E2 respectively, and the end faces of the pipe P3 are denoted by E31 and E32. The linear portions of the pipes P1 and P2 adjacent to the end faces E1 and E2 of the pipes P1 and P2 are denoted by A1 and A2 respectively. The linear portions of the pipe P3 adjacent to the end faces E31 and E32 of the pipe P3 are denoted by A31 and A32 respectively. The positions of the pipes P1 and P2 is fixed, and the pipe P3 is movable. The measurement data on the end face and section of each of the pipes already installed and the pipe to be attached is acquired as point group data that is a group of a plurality of pieces of point information where each point has three-dimensional coordinate data. A method of acquiring the point group data by the three-dimensional measuring device 20 will be described later in detail. Since the point group data includes three-dimensional coordinates (described later in detail), an absolute position that each pipe already installed is located at which position in a facility is acquired in the present embodiment. However, as long as a relative positional relationship between the two pipes already installed which are to be connected together by the pipe to be attached, and a relative positional relationship between both ends of the pipe to be attached are obtained, the three-dimensional coordinates may not be acquired.

The three-dimensional measurement data acquiring device 15 further generates a list of the three-dimensional data acquired from the three-dimensional measuring device 20, for example, a list in which the name of each of the pipes already installed or the pipe to be attached, the type of the point group data (the end face or the section), the three-dimensional coordinates of the point group data or the like are correlated with each other. The generated list is output from the three-dimensional measurement data acquiring device 15 to the memory 12, and is stored in the memory 12.

The three-dimensional data generating device 16 generates three-dimensional data of a distal end portion of each of the pipes already installed and three-dimensional data of a distal end portion of the pipe to be attached based on the three-dimensional data acquired by the three-dimensional measurement data acquiring device 15.

The machining amount calculating device 17 calculates a machining amount by recognizing an interference portion that is a portion where each of the pipes already installed overlaps with the pipe to be attached as a portion to be machined.

Figure 3:
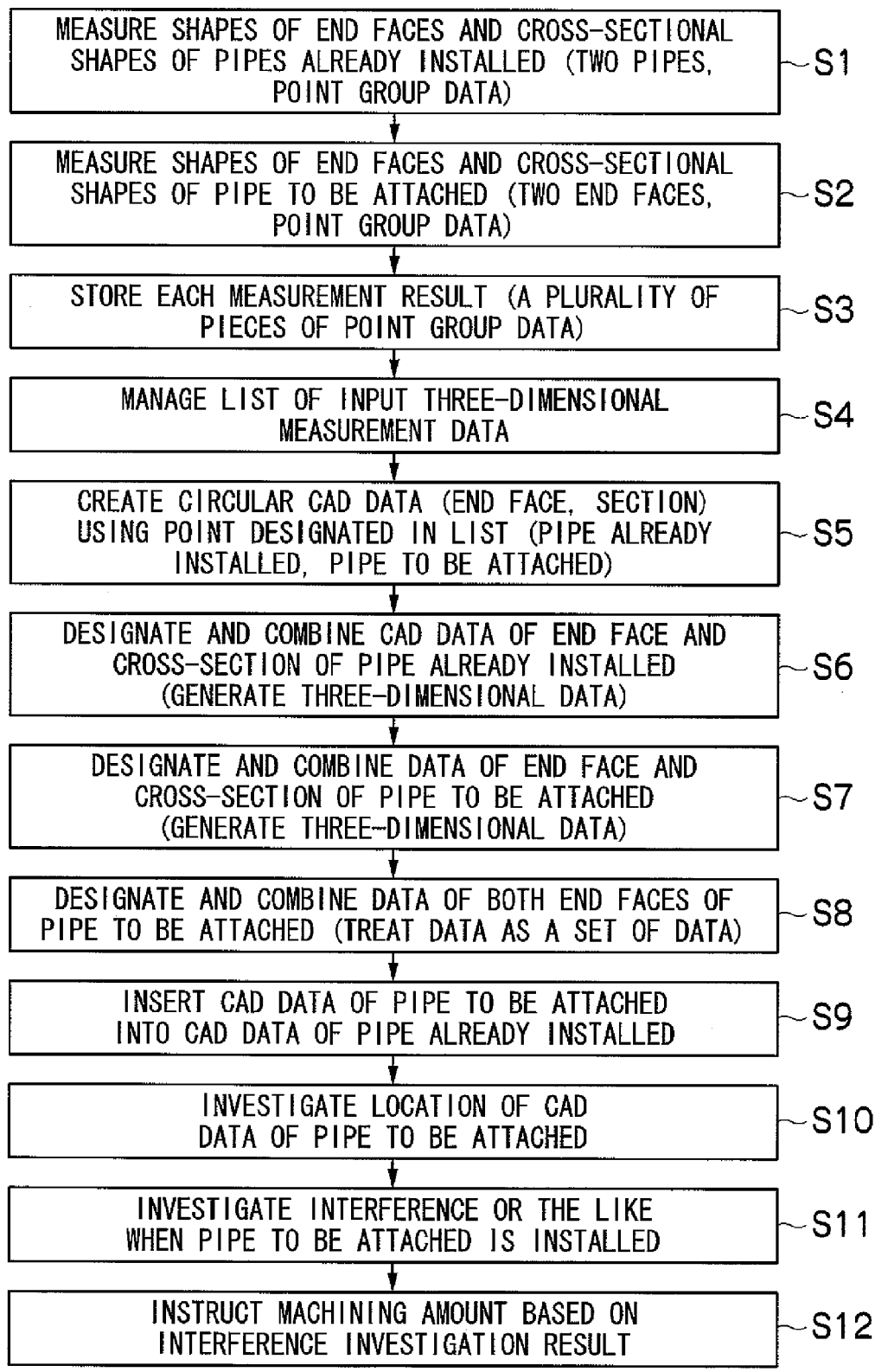
FIG. 3 is a flowchart illustrating a processing flow of the pipe installation support apparatus 1.

The operation of the pipe installation support apparatus 1 configured as described above will be described below. FIG. 3 is a flowchart illustrating an entire processing flow of the pipe installation support apparatus 1 in a situation shown in FIG. 2.

First, the CPU 11 gives an instruction to the three-dimensional measuring device 20. The three-dimensional measuring device 20 thereby acquires the point group data with respect to each of the end face of each of the pipes already installed, and the section at any position of the linear portion of the pipe adjacent to the end face (step S1). The CPU 11 further gives an instruction to the three-dimensional measuring device 20. The three-dimensional measuring device 20 thereby measures the shapes of the end face at the distal end of the pipe to be attached and the section at any position of the linear portion of the pipe adjacent to the end face and acquires the point group data with respect to each of the end face and the section (step S2).

Figure 4:
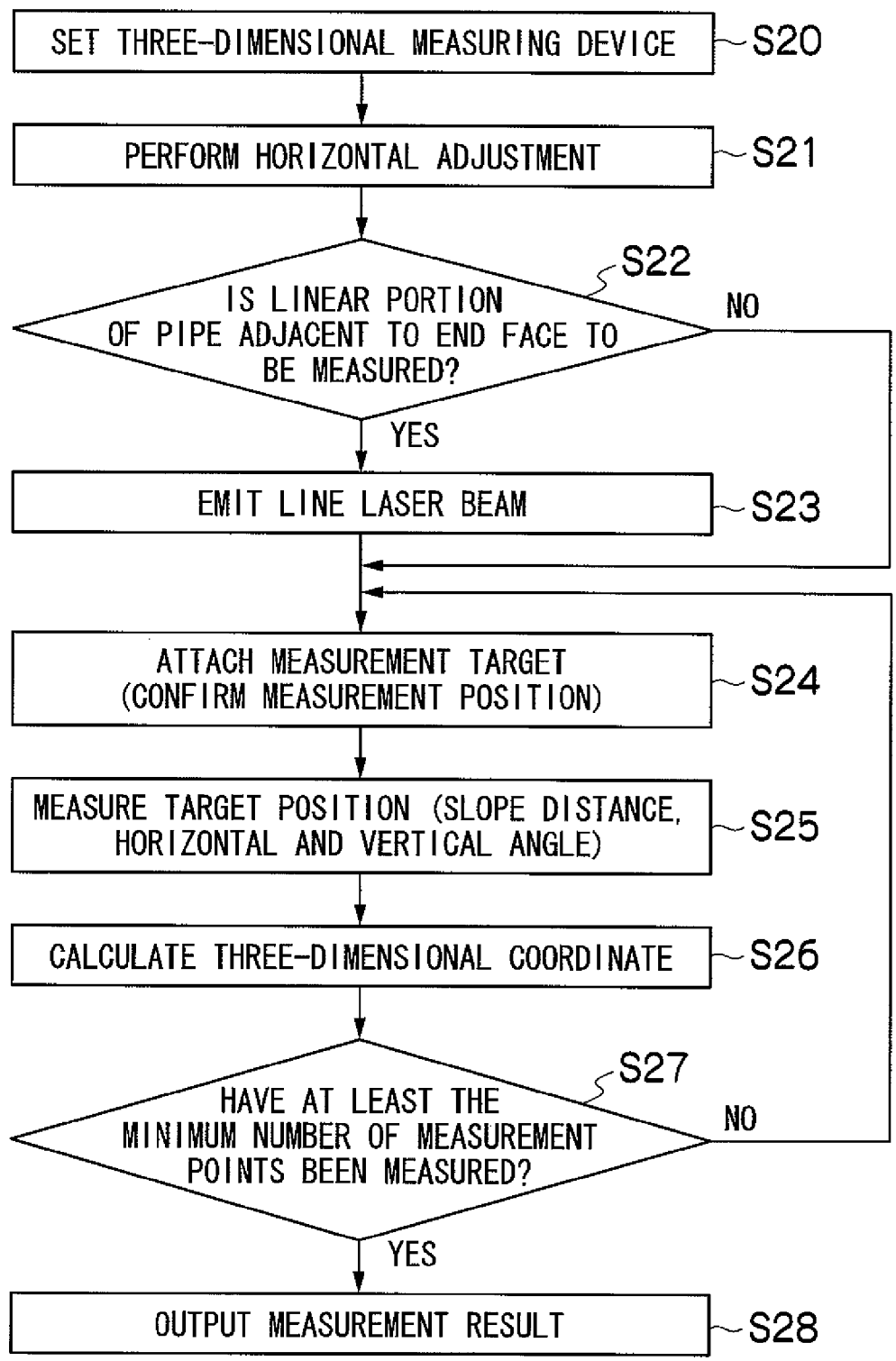
FIG. 4 is a flowchart illustrating a processing flow of measurement by a three-dimensional measuring device 20.

FIG. 4 is a flowchart illustrating a processing flow of acquiring the point group data by the three-dimensional measuring device 20 in steps S1 and S2. The process is mainly performed by a CPU (not shown) incorporated in the three-dimensional measuring device 20.

The three-dimensional measuring device 20 is placed in a facility (step S20). Since the measurement is performed based on the axis of earth as a reference axis, the Z axis of the three-dimensional measuring device 20 is aligned with the axis of earth to perform horizontal adjustment of the three-dimensional measuring device 20 (step S21). Specifically, the three-dimensional measuring device 20 is arranged so that the axis of earth becomes parallel to the Z axis of the three-dimensional measuring device 20.

The three-dimensional measuring device 20 determines whether or not the section of the linear portion of the pipe adjacent to the end face is to be measured based on the input from a measurer (step S22).

When it is determined that the section of the linear portion of the pipe adjacent to the end face is to be measured (YES in step S22), the three-dimensional measuring device 20 emits a line laser beam to any position of the linear portion of the pipe adjacent to the end face, that is, a position where the section shape is to be measured from a laser emitting section (not shown) incorporated in the three-dimensional measuring device 20. By emitting the line laser beam, the section at any position of the linear portion adjacent to the end face can be reliably designated. The process then moves to a process of attaching a measurement target (step S24). When it is determined that the section of the linear portion of the pipe adjacent to the end face is not to be measured, that is, the end face is to be measured (NO in step S22), the process directly moves to step S24.

To confirm a measurement position, the measurer attaches the measurement target to the position where the end face or the section of the linear portion of the pipe adjacent to the end face is to be measured (step S24).

Figure 5:
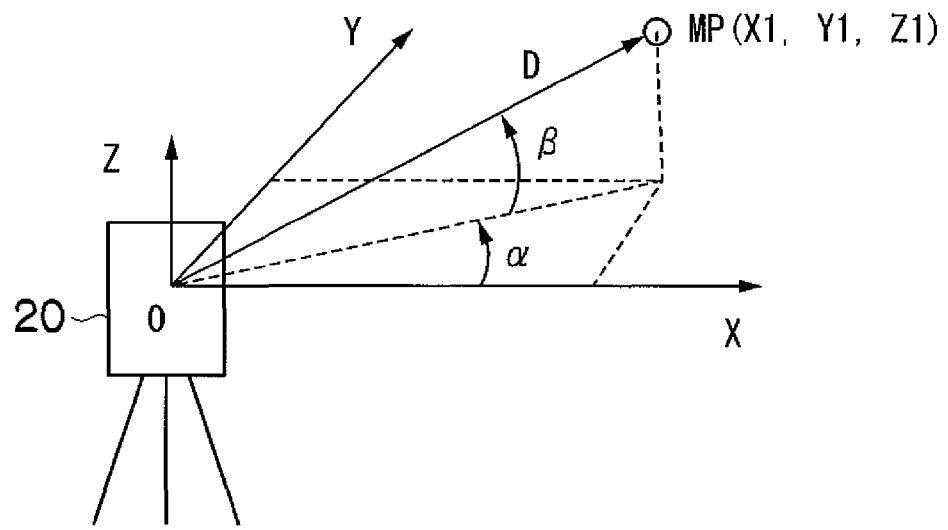
FIG. 5 is a view illustrating a method of measuring a measurement point by the three-dimensional measuring device 20.

As shown in FIG. 5, the three-dimensional measuring device 20 measures a slope distance D, a horizontal angle $\alpha$, and a vertical angle $\beta$ of the target (a measurement point MP) (step S25). The three-dimensional measuring device 20 calculates the three-dimensional coordinate ($X_1, Y_1, Z_1$) of the measurement point based on an equation for calculating the three-dimensional coordinate as shown in an expression 1 (step S26).

$$Z_1 = D \times \sin(\beta)$$

$$X_1 = D \times \cos(\beta) \times \cos(\alpha)$$

$$Y_1 = D \times \cos(\beta) \times \sin(\alpha) \qquad \text{[Expression 1]}$$

D: slope distance
$\alpha$: horizontal angle
$\beta$: vertical angle

The three-dimensional measuring device 20 determines whether or not at least the minimum number of measurement points have been measured (step S27). The theoretical minimum number of measurement points is 3 in the case of a true circle, and 4 in the case of an ellipse. It is preferable that 8 to 16 measurement points are measured in the case of a pipe of about ϕ300 to ϕ1000. Therefore, the minimum number of measurement points is 8 in the present embodiment.

When it is determined that at least the minimum number of measurement points have not been measured (NO in step S27), the respective processes from the target attachment (step S24) to the calculation of the three-dimensional coordinate (step S26) are performed again.

When it is determined that at least the minimum number of measurement points has been measured, the three-dimensional measuring device 20 outputs the measurement result to the three-dimensional CAD apparatus 10 to centrally manage the measurement result (step S28).

Figure 6:
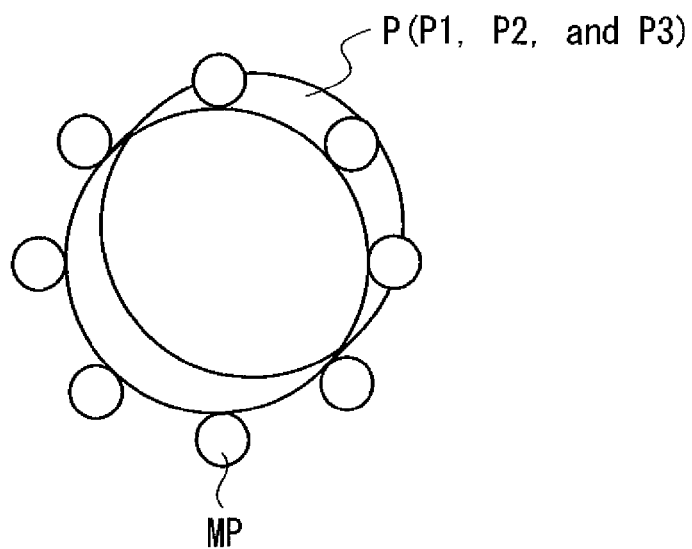
FIG. 6 is a view illustrating point group data measured by the three-dimensional measuring device 20.

The process of acquiring the point group data is thereby completed, and the three-dimensional coordinate (point group data) is acquired for the 8 measurement points MP along the outer periphery of the pipe P (the pipes P1 and P2 already installed, and the pipe P3 to be attached) as shown in FIG. 6. Although the example in which the process of attaching the measurement target (step S24) is performed is shown in FIG. 4, the process in step S24 may be skipped in a case where the measurement target is not required because of the specifications of the three-dimensional measuring device 20.

The CPU 11 gives an instruction to the three-dimensional measurement data acquiring device 15. The three-dimensional measurement data acquiring device 15 thereby acquires the data acquired by the three-dimensional measuring device 20 in steps S1 and S2 from the three-dimensional measuring device 20, and stores the data in the memory 12 (step S3). The three-dimensional measurement data acquiring device 15 also generates the list of the data acquired in step S3 and stores the list in the memory 12 (step S4).

Figure 7:
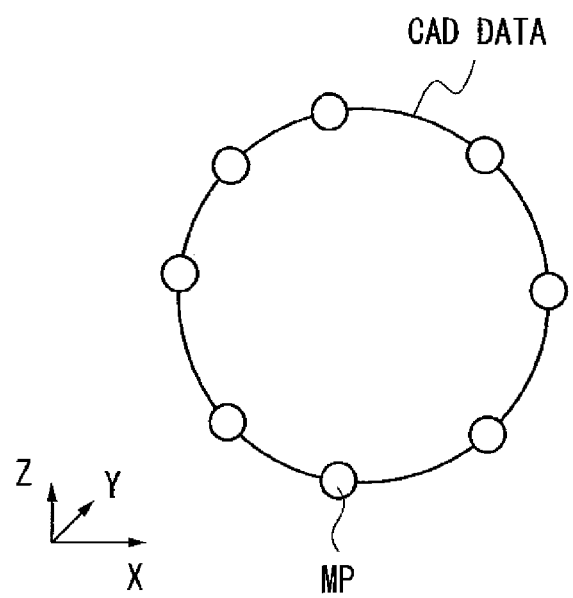
FIG. 7 is a view illustrating a process of generating substantially circular CAD data from the point group data.

The CPU 11 gives an instruction to the three-dimensional data generating device 16. The three-dimensional data generating device 16 thereby acquires the point group data stored in the memory 12, and generates substantially circular (two-dimensional) CAD data of each of the shapes of the distal end face and the section at any position of the linear portion of the pipe adjacent to the end face with respect to each of the pipes already installed and the pipe to be attached by connecting the 8 measurement points as shown in FIG. 7 (step S5).

The three-dimensional data generating device 16 generates three-dimensional CAD data of the distal end portion of each of the pipes already installed based on the substantially circular CAD data of the distal end face of each of the pipes already installed and the section at any position of the linear portion of the pipe adjacent to the end face generated in step S5. The three-dimensional data generating device 16 locates the three-dimensional CAD data of each of the pipes already installed on a coordinate system for the pipes already installed in a virtual space based on the three-dimensional coordinates of the measurement points (step S6).

Figure 8A:
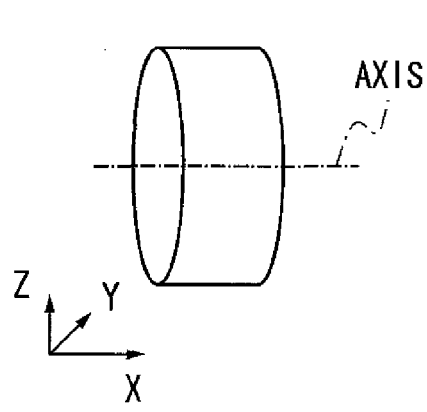
FIGS. 8A and 8B are views illustrating a process of generating three-dimensional CAD data.

That is, the three-dimensional data generating device 16 selects the substantially circular CAD data of the end face and the substantially circular CAD data of the section at any position of the linear portion of the pipe adjacent to the end face with respect to each of the pipes already installed, and calculates the position and direction of the axis AX1 and AX2 of each of the pipes P1 and P2 already installed based on the substantially circular CAD data as shown in FIG. 8A. Accordingly, even when the end faces E1 or E2 is cut at a slant with respect to the pipes P1 and P2, the direction of the axis AX1 and AX2 can be accurately calculated.

The axis direction is normally obtained by a vector equation as shown in an expression 2. The axis position is obtained as the center of the substantially circular CAD data representing the end face. The vector equation and the axis position are stored in the list in the memory 12 in correlation with the point group data of each of the pipes already installed.

$$n = ai + bj + ck \qquad \text{[Expression 2]}$$

(i,j,k): unit vector (indicating which directional component in each direction of XYZ axes)
(a,b,c): vector component (indicating a directional property with respect to each of XYZ axes)

The three-dimensional data generating device 16 extends the substantially circular CAD data of the end face in the axis direction to generate the substantially cylindrical three-dimensional CAD data.

Figure 8B:
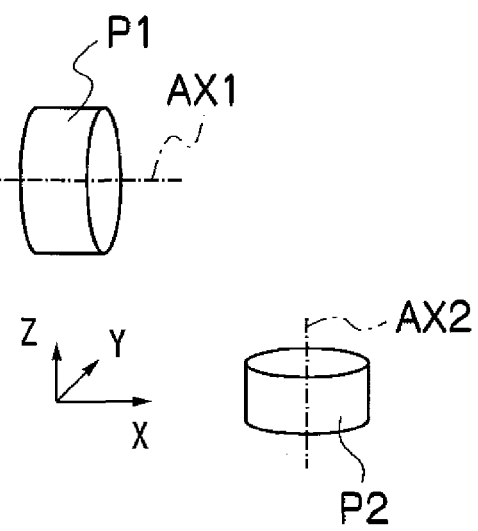

The three-dimensional data generating device 16 then locates the three-dimensional CAD data of all the pipes already installed on the coordinate system for the pipes already installed in the virtual space so as to reproduce the measured three-dimensional coordinates. For example, in the case shown in FIG. 2, the three-dimensional CAD data of the two pipes P1 and P2 already installed are located within the virtual space as shown in FIG. 8B. Accordingly, the actual pipe installation state can be closely reproduced within the virtual space.

Subsequently, the three-dimensional data generating device 16 generates three-dimensional CAD data (including the vector equation of the axis) of the distal end portion of the pipe to be attached based on the substantially circular CAD data of the end face of the pipe to be attached and the section at any position of the linear portion of the pipe adjacent to the end face, and locates the three-dimensional CAD data of the pipe to be attached on a coordinate system for the pipe to be attached in a virtual space based on the three-dimensional coordinates of the measurement points by using the same method as that in step S6 (step S7). As a result, the three-dimensional data reproducing the relative positional relationship between the distal end portions at both ends of the pipe to be attached can be generated.

The three-dimensional data generating device 16 selects the three-dimensional CAD data of both ends of the pipe to be attached located on the coordinate system for the pipe to be attached, and combines the three-dimensional CAD data of both ends (step S8). Accordingly, the three-dimensional data of the distal end portions at both ends of the pipe to be attached can be treated as a set of data. Therefore, when the coordinate system is moved within the virtual space, the three-dimensional data of the distal end portions at both ends of the pipe to be attached can be moved at the same time and in the same way.

The coordinate system for the pipes already installed and the coordinate system for the pipe to be attached may be the same coordinate system or may be separate coordinate systems. In the present embodiment, the pipes already installed and the pipe to be attached are located on the separate coordinate systems. When there are a plurality of pipes to be attached, all the pipes to be attached may be located on one coordinate system or may be respectively separately located on coordinate systems. In the present embodiment, the pipes to be attached are respectively separately located on the coordinate systems.

The CPU 11 inserts the coordinate system for the pipe to be attached generated in step S8 into the coordinate system for the pipes already installed generated in step S6 (step S9). A virtual space including the two coordinate systems of the coordinate system for the pipes already installed and the coordinate system for the pipe to be attached is thereby generated, so that the actual position of the pipe end face, a surface tilt state or the like can be reproduced on the CAD system. Although the coordinate system for the pipe to be attached is inserted into the coordinate system for the pipes already installed in the present embodiment, the coordinate system for the pipes already installed may be inserted into the coordinate system for the pipe to be attached.

The process then moves to a step of investigating the location of the pipe to be attached (step S10). The step of investigating the location of the pipe to be attached may be manually performed by an operator or automatically performed by the CPU 11. The case in which an operator manually performs the step and the case in which the CPU 11 automatically performs the step will be respectively described in the following.

(the case in which an operator manually performs the step)

The CPU 11 gives an instruction to the image generating device 18. The image generating device 18 thereby generates projection views obtained by projecting the three-dimensional CAD data of the pipes already installed and the pipe to be attached located in the virtual space in step S9 onto each of an XY plane, a YZ plane and an XZ plane. The image generating device 18 also generates a three-dimensional image (a three-dimensional image in which a three-dimensional image of the pipes already installed and a three-dimensional image of the pipe to be attached are superimposedly displayed) which directly shows the three-dimensional CAD data of the pipes already installed and the pipe to be attached located in the virtual space. When an operator operates the input device 14 to input a desired image, the display control device 13 selects the view selected by the operator from the projection views and the three-dimensional image generated by the image generating device 18, and outputs the view to the display device 19. The image showing the virtual space is thereby displayed on the display device 19, so that the operator can check a positional relationship between the pipes already installed and the pipe to be attached.

Figure 9C:
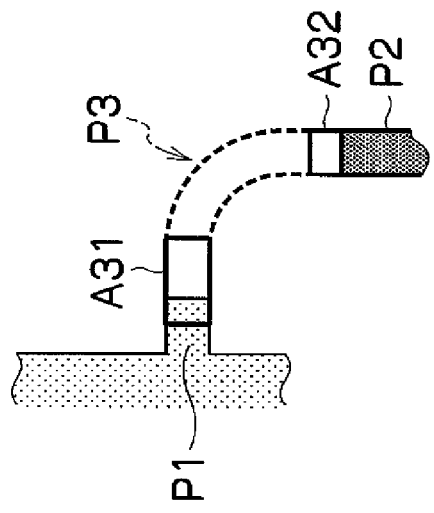
FIGS. 9A to 9C are views illustrating investigation process of interference between each of pipes already installed and a pipe to be attached.
Figure 9B:
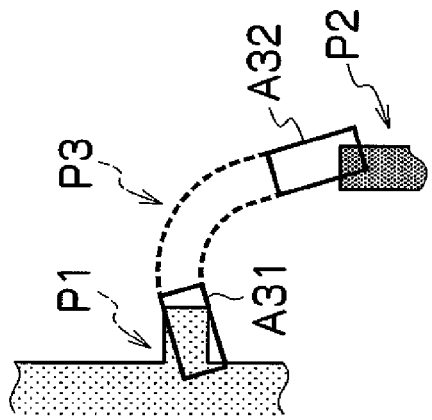
Figure 9A:
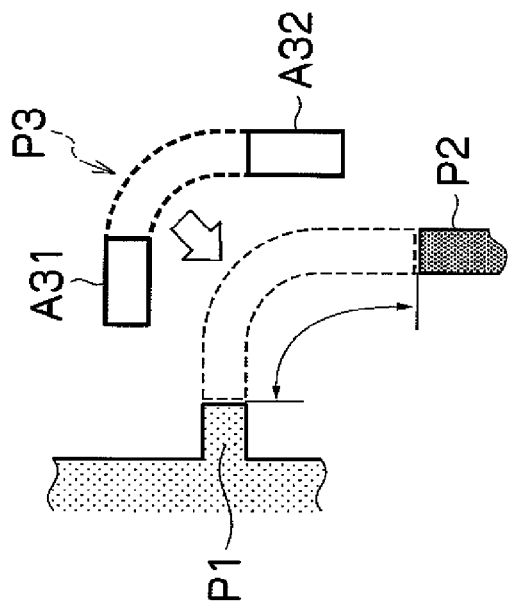

As a result, the operator can check the locations of the pipes already installed or the like or investigate the interference state of the pipe to be attached having a machining allowance or the like on the CAD system as shown in FIGS. 9A to 9C.

When the operator operates the input device 14 while checking the image displayed on the display device 19 to translate and rotate the coordinate system for the pipe P3 to be attached, the instruction is input to the CPU 11 from the input device 14. The CPU 11 moves the coordinate system for the pipe P3 to be attached to move the position of the pipe P3 to be attached. When the pipe P3 to be attached is translated and rotated from a state in which the investigation is started shown in FIG. 9A (start state), a state shown in FIG. 9B (state 1 in which CAD data is moved) is obtained. When the pipe P3 to be attached is rotated from the state, a state shown in FIG. 9C (state 2 in which CAD data is moved) is obtained. The operator investigates the location in such a manner. When the pipe P3 to be attached is located at an optimum position, that is, at a position where the pipe P3 to be attached most appropriately connects a pipe P1 already installed and a pipe P2 already installed, the operator operates the input device 14 to input an instruction to terminate the operation. The step (step S10) is thereby completed.

The three-dimensional data of both ends of the pipe to be attached are combined in step S8 and thus can be moved as the set of data. Therefore, when the pipe to be attached is translated and rotated, the three-dimensional data of only one of the distal end portions does not move by itself, but the three-dimensional data of the other distal end portion also move by following the first distal end portion. Accordingly, it is not necessary to take into consideration the movement of the CAD data of the end face on the side to which the instruction of movement has not been given, and the location becomes easier to investigate.

(the case in which the CPU 11 automatically performs the step)

Figure 10:
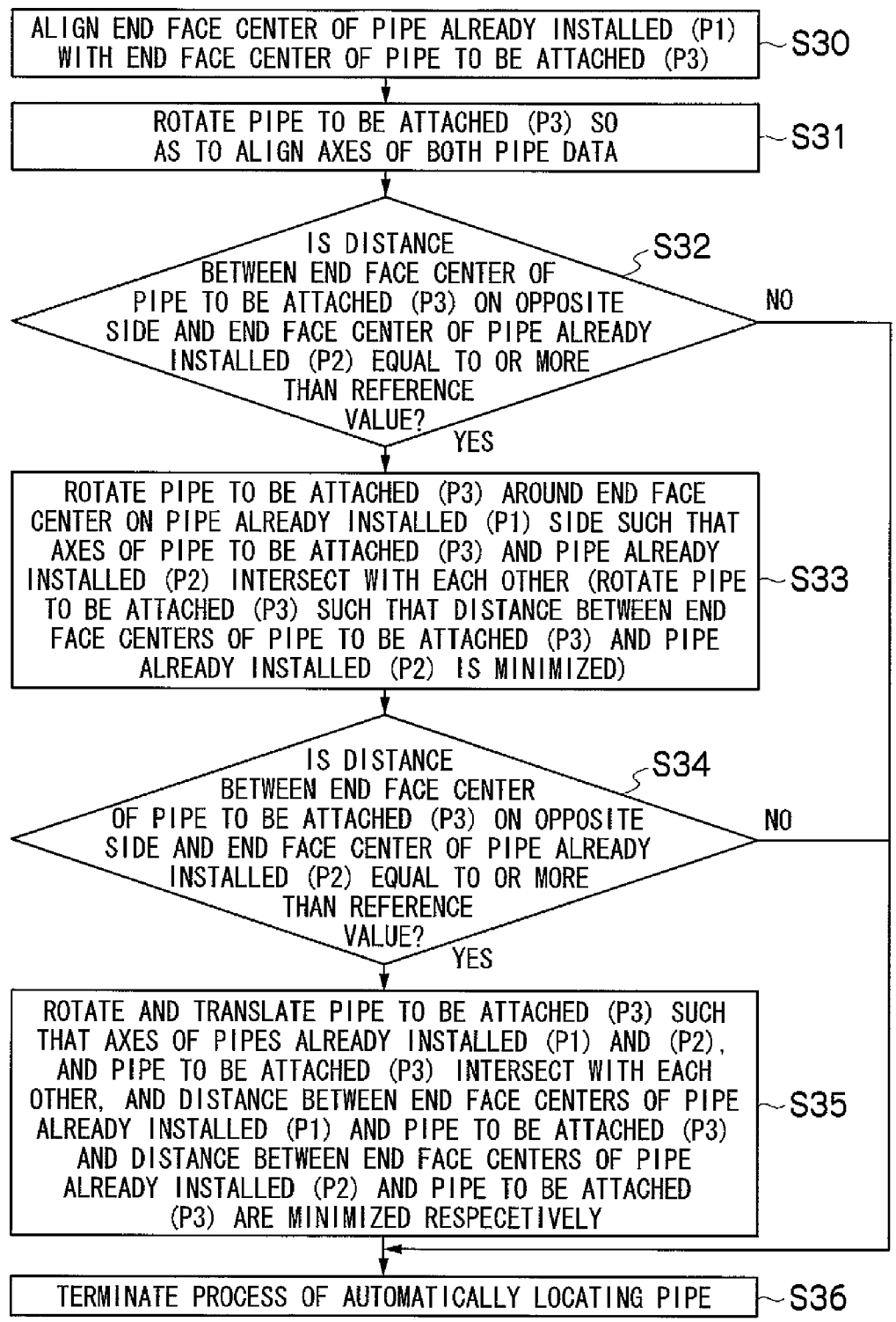
FIG. 10 is a flowchart illustrating a processing flow of automatically locating the pipe to be attached at an optimum position.

FIG. 10 is a flowchart illustrating a processing flow in which the CPU 11 locates the pipe to be attached at an optimum position by automatically investigating the location of the pipe to be attached.

Figure 11:
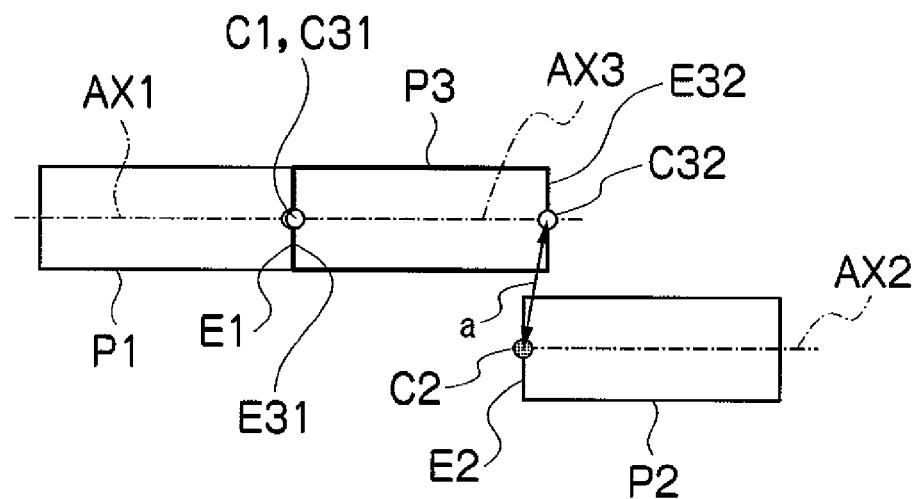
FIG. 11 is a view illustrating a process of automatically locating the pipe to be attached at the optimum position.

First, the CPU 11 translates the coordinate system for the pipe P3 to be attached by using an expression 3 so as to align the end face center of one of the end faces of the pipe P3 to be attached with the end face center of the pipe already installed (the pipe P1 already installed here) to be connected to the end face as shown in FIG. 11 (step S30). As shown in FIG. 11 (side view of the pipes), the end face center C1 of the pipe P1 already installed is a point where the end face E1 and the axis AX1 thereof intersect with each other. The end face center C2 of the pipe P2 already installed is a point where the end face E2 and the axis AX2 thereof intersect with each other. The end face centers C31 and C32 of the pipe P3 to be attached are points where the end face E31 and E32 and the axis AX3 thereof intersect with each other, respectively.

The CPU 11 rotates the coordinate system for the pipe P3 to be attached around the end face center C31 of the pipe P3 to be attached on the side aligned with the end face center C1 of the pipe P1 already installed in step S30 (in the following, the end face center of the pipe P3 to be attached on this side is referred to as the end face center C31 on the pipe P1 already installed side, and the end face center on the opposite side is referred to as the end face center C32 on the pipe P2 already installed side) by using the expression 3 so as to align the axis direction of the pipe to be attached with the axis direction of the pipe P1 already installed, that is, so as to align a vector component in the vector equation of the pipe P3 to be attached with a vector component in the vector equation of the pipe P1 already installed (step S31).

$$\begin{pmatrix} x' \\ y' \\ z' \end{pmatrix} = \begin{pmatrix} \cos\omega & -\sin\omega & 0 \\ \sin\omega & \cos\omega & 0 \\ 0 & 0 & 1 \end{pmatrix}$$ [Expression 3]

$$\begin{pmatrix} \cos\phi & 0 & \sin\phi \\ 0 & 1 & 0 \\ -\sin\phi & 0 & \cos\phi \end{pmatrix} \begin{pmatrix} 1 & 0 & 0 \\ 0 & \cos\kappa & -\sin\kappa \\ 0 & \sin\kappa & \cos\kappa \end{pmatrix} \begin{pmatrix} x \\ y \\ z \end{pmatrix} + \begin{pmatrix} \Delta x \\ \Delta y \\ \Delta z \end{pmatrix}$$

(x',y',z'): coordinate after movement
(x,y,z): coordinate before movement
(Δx,Δy,Δz): amount of translation
ω: amount of rotation around the z axis
φ: amount of rotation around the y axis
κ: amount of rotation around the x axis The CPU 11 determines whether or not a distance "a" between the end face center C32 of the pipe P3 to be attached on the pipe P2 already installed side and the end face center C2 of the pipe already installed (the pipe P2 already installed here) to be connected to the end face E32 of the pipe P3 to be attached is equal to or more than a reference value (about 1 mm) as shown in FIG. 11 (step S32). The end face center C32 of the pipe P3 to be attached on the pipe P2 already installed side and the end face center C2 of the pipe P2 already installed do not need to be completely aligned with each other. Although depending on the condition of the pipe thickness or the like, there is no problem connecting the pipes even when the end faces E2 and E32 are away from each other by about 1 mm. Thus, the distance with which there is no problem connecting the pipes (about 1 mm) is employed as the reference value in step S32.

When the distance "a" between the end face center C32 of the pipe P3 to be attached on the pipe P2 already installed side and the end face center C2 of the pipe P2 already installed is less than the reference value (less than the reference value in step S32), the CPU 11 determines that the pipe P3 to be attached is at the optimum position, and terminates the process of locating the pipe P3 to be attached at the optimum position.

Figure 12:
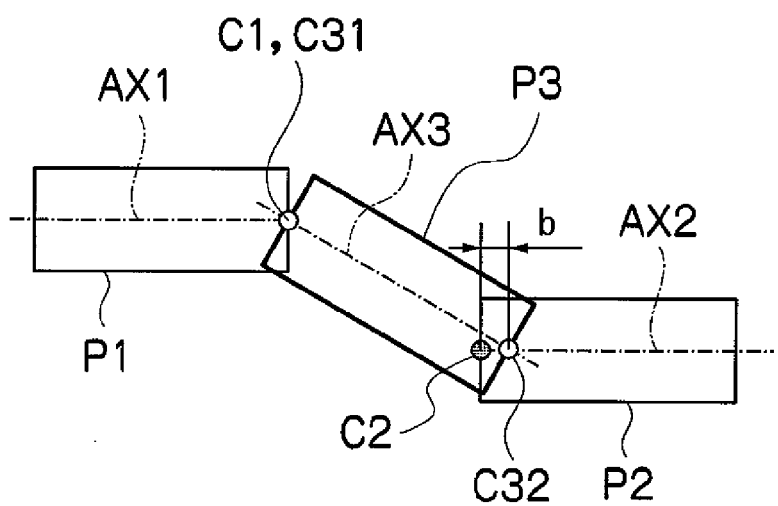
FIG. 12 is a view illustrating the process of automatically locating the pipe to be attached at the optimum position.

When the distance "a" between the end face center C32 of the pipe P3 to be attached on the pipe P2 already installed side and the end face center C2 of the pipe P2 already installed is equal to or more than the reference value (equal to or more than the reference value in step S32), the end face center C1 of the pipe P1 already installed and the end face center P31 of the pipe P3 to be attached on the pipe P1 already installed side are aligned with each other, and the pipe P3 to be attached is rotated around the end face center P31 on the pipe P1 already installed side such that the axis AX3 of the pipe P3 to be attached intersects with the axis AX2 of the pipe P2 already installed and a distance "b" between the end face center C32 of the pipe P3 to be attached on the pipe P2 already installed side and the end face center C2 of the pipe P2 already installed becomes shortest as shown in FIG. 12 (step S33).

The CPU 11 then determines whether or not the distance "b" between the end face center C32 of the pipe P3 to be attached on the pipe P2 already installed side and the end face center C2 of the pipe P2 already installed is equal to or more than a reference value (about a few mm) (step S34).

When the distance "b" between the end face center C32 of the pipe P3 to be attached on the pipe P2 already installed side and the end face center C2 of the pipe P2 already installed is less than the reference value (less than the reference value in step S34), the CPU 11 determines that the pipe to be attached is at the optimum position, and terminates the process of locating the pipe to be attached at the optimum position.

Figure 13:
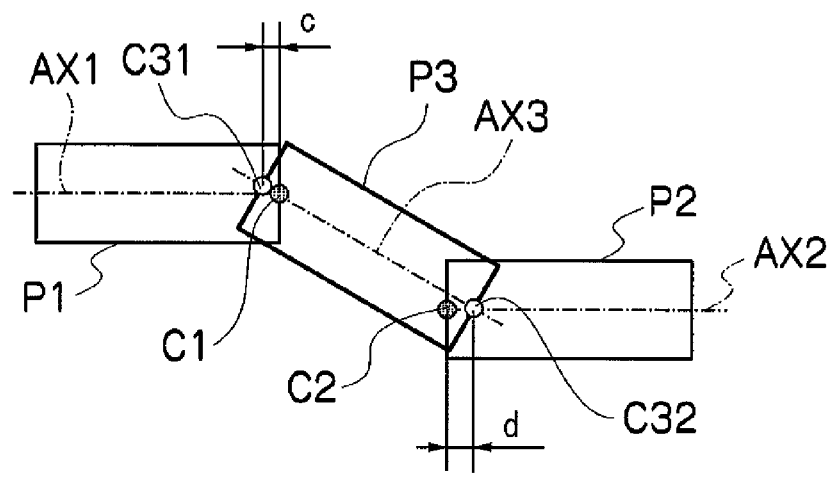
FIG. 13 is a view illustrating the process of automatically locating the pipe to be attached at the optimum position.

When the distance "b" between the end face center C32 of the pipe P3 to be attached on the pipe P2 already installed side and the end face center C2 of the pipe P2 already installed is equal to or more than the reference value (equal to or more than the reference value in step S34), the CPU 11 translates the pipe P3 to be attached along the axis direction of the pipe P3 to be attached such that the axis AX3 of the pipe P3 to be attached intersects with the axes AX1 and AX2 of the pipe P1 already installed and the pipe P2 already installed and a distance "c" between the end face center C31 of the pipe P3 to be attached on the pipe P1 already installed side and the end face center C1 of the pipe P1 already installed, and a distance "d" between the end face center C32 of the pipe P3 to be attached on the pipe P2 already installed side and the end face center C2 of the pipe P2 already installed become shortest as shown in FIG. 13 (step S35). The position is the optimum position for the pipe P3 to be attached. The CPU 11 thereby terminates the process of locating the pipe P3 to be attached at the optimum position. Accordingly, the pipe P3 to be attached can be automatically located at the optimum position.

In the processes in steps S33 and S35, the condition that the axis AX2 of the pipe P2 already installed and the end face center C32 of the pipe P3 to be attached on the pipe P2 already installed side are aligned with each other may be further added to perform the process more appropriately.

When the step of investigating the location of the pipe to be attached (step S10) has been completed, the three-dimensional coordinates of the point group data of the pipe to be attached located at the optimum position, and the vector equation of the axis thereof are stored in the memory 12.

Figure 14:
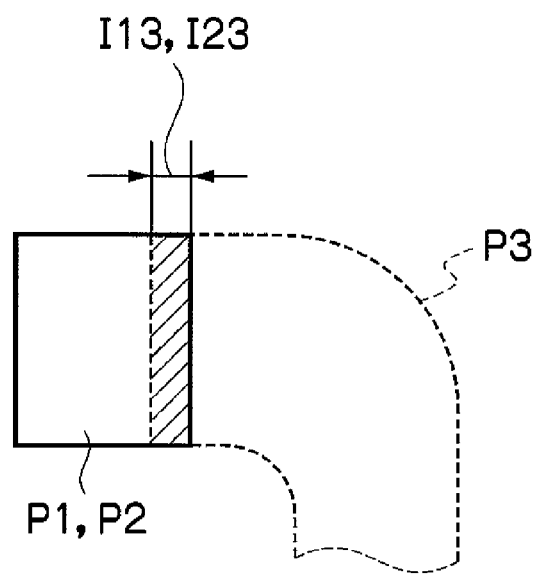
FIG. 14 is a view illustrating investigation process of interference between the pipe already installed and the pipe to be attached.

The CPU 11 investigates the interference state of the pipe P3 to be attached, that is, checks whether there is a portion where the pipe P1 and P2 already installed and the pipe P3 to be attached overlap (interfere) with each other, that is, the interference portion I13 and I23 respectively, as shown in FIG. 14 (step S11). The process is performed by investigating whether or not the three-dimensional CAD data overlap with each other.

When it is confirmed that there is an interference portion in step S11, the CPU 11 instructs the machining amount calculating device 17 to calculate the machining amount (step S12).

Figure 15:
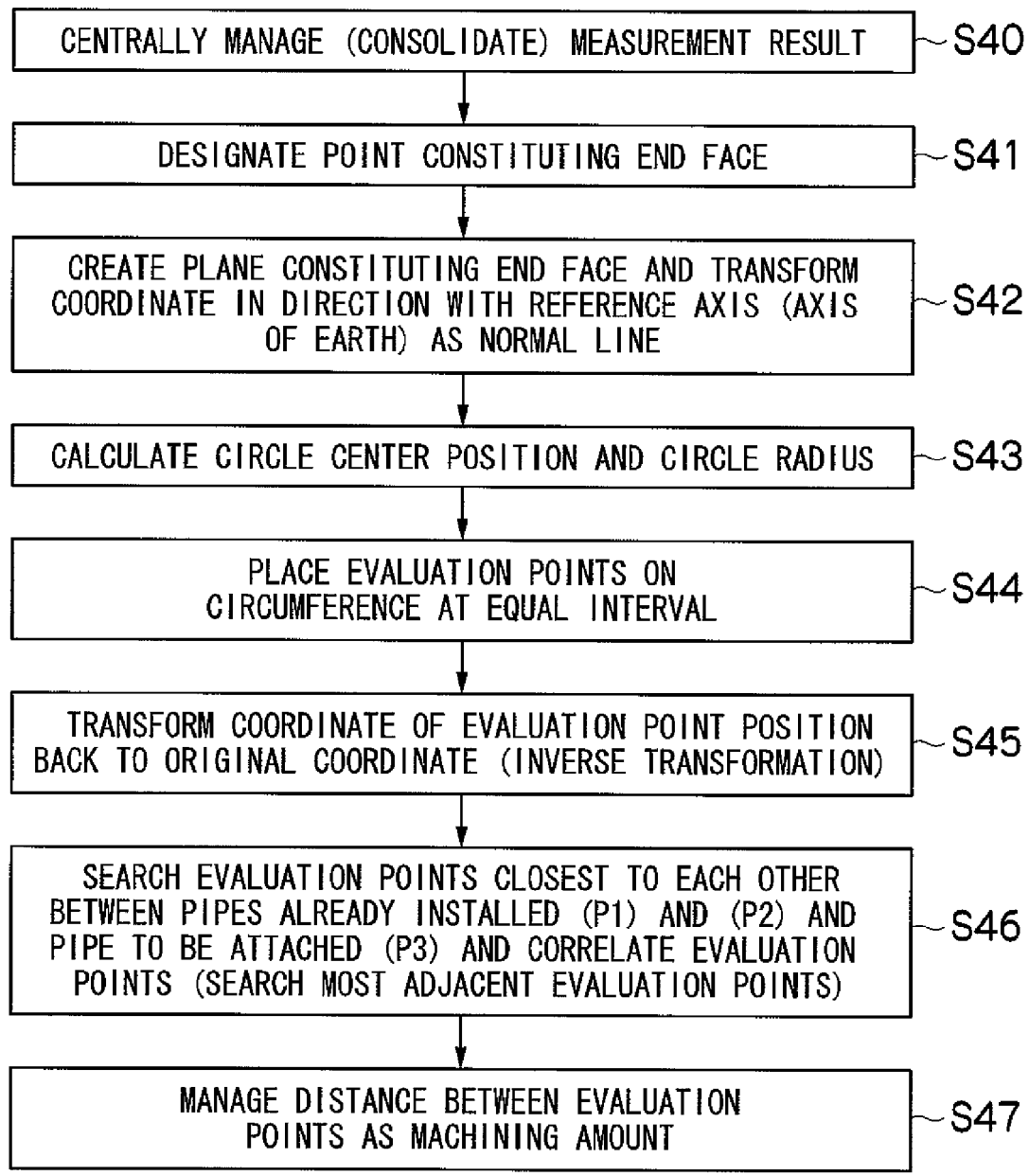
FIG. 15 is a flowchart illustrating a processing flow of calculating a machining amount.

FIG. 15 is a flowchart illustrating a processing flow in which the machining amount calculating device 17 calculates the machining amount.

The machining amount calculating device 17 performs a process of providing an evaluation point on the end face of the pipe whose machining amount is to be calculated (for example, the pipe P1 already installed, the pipe P2 already installed, and the pipe P3 to be attached) (steps S40 to S45).

First, the machining amount calculating device 17 acquires the point group data of the pipes P1 and P2 already installed, the vector equations of the axes thereof, the three-dimensional coordinates of the point group data of the pipe P3 to be attached located at the optimum position, and the vector equation of the axis thereof from the list stored in the memory 12 (step S40). The machining amount calculating device 17 designates the points (the 8 measurement points in the present embodiment) constituting the end face E1, E2, E31 and E32 of each of the pipe P1 already installed, the pipe P2 already installed, and the pipe P3 to be attached, and the vector equations of the axes therefrom (step S41).

The machining amount calculating device 17 transforms the coordinates of the point group data of the end face such that the axis AX3 of the pipe P3 to be attached is aligned with (parallel to) the reference axis (the axis of earth) based on each of the vector equations designated in step S41 (step S42: create plane constituting the end face and, transform a coordinate in direction with the reference axis (the axis of the earth) as a normal line). The coordinate transformation can be performed by use of the expression 3.

The machining amount calculating device 17 calculates the center position and radius of a circle representing the end faces E1, E2, E31 and E32 based on the coordinates of the 8 measurement points after being coordinate-transformed (step S43). The machining amount calculating device 17 places the predetermined number of evaluation points (for example, 8, 16, 32 or the like) on the circumference of the circle representing the end faces at equal intervals based on the calculated center position and circle radius (step S44). The evaluation point is a point as a reference for calculating the machining amount as described later (step S47). As there are more evaluation points, the machining amount can be calculated more accurately. In the present embodiment, 8 evaluation points are placed.

The coordinates of the evaluation points placed in step S44 are transformed back to restore the coordinates before being transformed in step S42 (the original coordinates) (step S45). Accordingly, the process of providing the evaluation point on the end faces E1, E2, E31 and E32 of each of the pipe P1 already installed, the pipe P2 already installed, and the pipe P3 to be attached is completed.

By determining a reference point for placing the evaluation points in step S44 (for example, a point having a largest value along the X or Y axis in a state in which the coordinates are transformed so as to align the axis with (make the axis parallel to) the reference axis (the axis of earth) is employed as the reference point, or a point having a largest value along the Z axis in the original coordinates is employed as the reference point), the evaluation points of each of the pipes already installed and the evaluation points of the pipe to be attached can be aligned with each other in position after the original coordinates are restored in step S45.

Subsequently, the machining amount calculating device 17 searches the evaluation point of each of the pipe P1 already installed and the pipe P2 already installed and the evaluation point of the pipe P3 to be attached, the evaluation points being closest to each other, and correlates the evaluation points with each other (step S46). The distance between the evaluation points correlated with each other is calculated as the machining amount (step S47).

Figure 16:
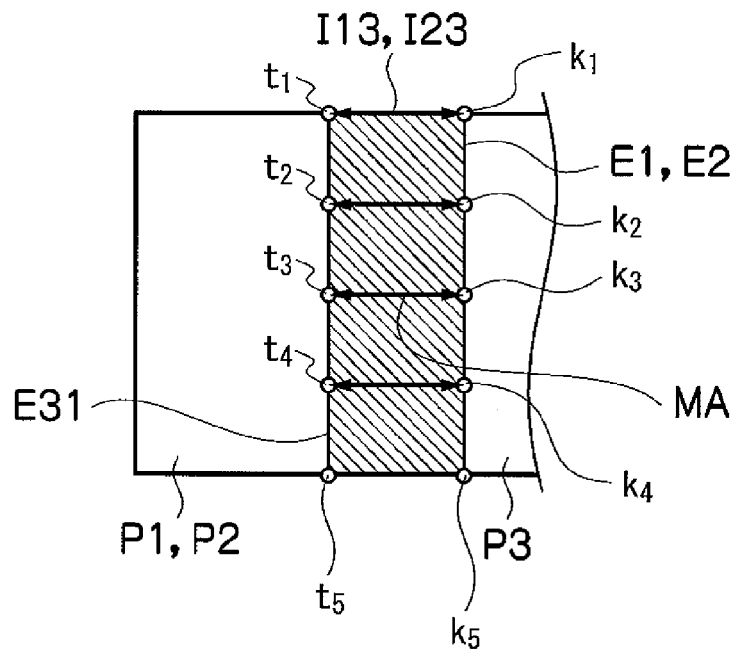
FIG. 16 is a view illustrating a method of calculating the machining amount.

The processes in steps S46 and S47 will be described by using FIG. 16. The processes between the pipe P2 and P3 can be performed in similar fashion. A distance between an evaluation point t1 placed on the end face E3 of the pipe P3 to be attached and each of evaluation points k1 to k8 (evaluation points k6 to k8 are not shown in FIG. 16) placed on the pipe P1 already installed is calculated. Since the evaluation point closest to the evaluation point t1 is the evaluation point k1, the evaluation point t1 is correlated with the evaluation point k1. The correlating process is similarly performed on the evaluation points t2 to t8, and the evaluation points t2 to t8 are respectively correlated with the evaluation points k2 to k8.

Each distance (the machining amount) from the evaluation point t1 to the evaluation point k1, from the evaluation point t2 to the evaluation point k2, and so on through the evaluation point t8 and the evaluation point k8, is calculated by using an expression 4.

$$\text{Distance } r = \sqrt{(x_i-x_j)^2+(y_i-y_j)^2;(z_i-z_j)^2} \quad \text{[Expression 4]}$$

Evaluation point ti($x_i,y_i,z_i$)
Evaluation point kj($x_j,y_j,z_j$)
i,j=1 to 8 (since there are 8 evaluation points in the present embodiment)

Figure 17:
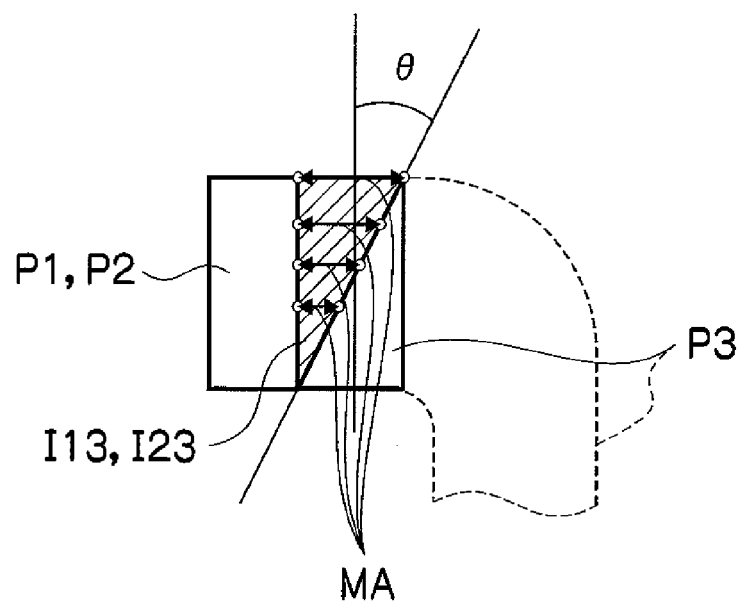
FIG. 17 is a view illustrating the method of calculating the machining amount.

The machining amount MA is calculated by using the distance between the evaluation points as described above. Accordingly, even when the end face E31 of the pipe P3 to be attached is inclined relative to the end face E1 of the pipe P1 already installed as an angle (tilt between the pipe surfaces) θ in shown in FIG. 17, the machining amount MA can be easily calculated.

The machining amount calculating device 17 stores the calculated machining amount with the point group data in the memory 12. The machining amount calculating device 17 also outputs the calculated machining amount to the display device 19 via the display control device 13. The machining amount is thereby displayed on the display device 19, and the machining amount can be instructed to the field (facility floor) where the pipe is actually machined.

The machining amount calculating device 17 also outputs the calculated machining amount to the pipe machining device 30. Accordingly, the calculated machining amount can be directly used in the pipe machining device 30, thereby facilitating the pipe machining.

According to the present embodiment, the actual pipe installation positions or the like are reproduced in the virtual space, so that the interference portion (the interference portion I13 at which the pipe P1 already installed and the pipe P3 to be attached interfere with each other, the interference portion I23 at which the pipe P2 already installed and the pipe P3 to be attached interfere with each other) obtained when the pipe to be attached is installed on the pipes already installed can be checked, and the machining amount of the pipe to be attached can be automatically calculated. Therefore, pipe installation support, such as investigating the interference and giving the instruction to machine the pipe in the field, can be provided without having to perform an operation of holding up the pipe.

Also, according to the present embodiment, the three-dimensional images of the distal end portions at both end faces of the pipe to be attached are treated as one set, so that when the three-dimensional image of one of the distal end portions of the pipe to be attached is moved, the three-dimensional image of the other distal end portion also moves by following the first distal end portion. Therefore, when the location of the pipe to be attached is manually investigated, it is not necessary to take into consideration the movement of the three-dimensional image of the distal end portion on the side to which the instruction of movement has not been given after moving the three-dimensional image of the other distal end portion, and the location can be more easily investigated.

Also, according to the present embodiment, the CAD data of the distal end portion of the pipe is represented as the three-dimensional data including not only the section shape of the distal end but also the axis direction of the pipe. Therefore, the pipe shape can be represented, and the interference and the machining amount instruction can be investigated with higher accuracy.

Also, according to the present embodiment, the point group data of the end face and the section at any position of the linear portion adjacent to the end face are acquired, so that the axis direction can be calculated. Therefore, the location of the pipe to be attached can be automatically investigated by using the axis position.

Figure 18:
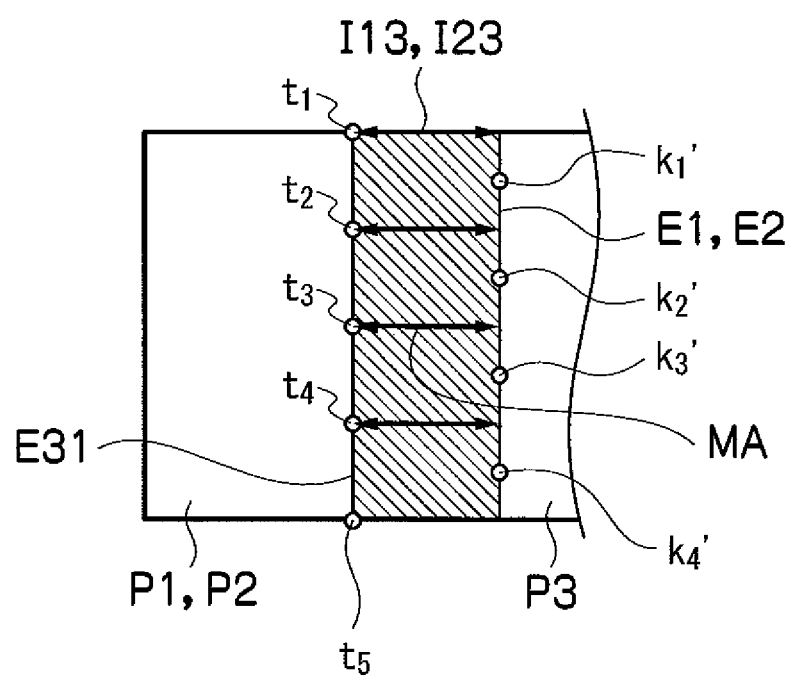
FIG. 18 is a view illustrating another method of calculating the machining amount.

Since the reference point for placing the evaluation points in step S44 is determined in the present embodiment, the evaluation points of each of the pipes already installed and the evaluation points of the pipe to be attached can be aligned with each other in position. When the reference point is not determined, the evaluation points of the pipe already installed and the evaluation points of the pipe to be attached may not be aligned in position as shown in FIG. 18. In such a case, a distance between a point where a line extending from each of the evaluation points of the pipe to be attached in the normal direction of the end face of the pipe to be attached intersects with the pipe already installed, and each of the evaluation points of the pipe to be attached may be obtained.

Although the three-dimensional data of the distal end portions of the pipes already installed and the pipe to be attached are generated in the present embodiment, the three-dimensional data of the entire pipe may be also generated. To generate the three-dimensional data of the entire pipe, the section may be acquired at a plurality of positions in the pipe to obtain the axis of the pipe, and the three-dimensional data may be generated based on the data. Accordingly, the same effect as that when the three-dimensional images of the distal end portions at both ends of the pipe to be attached are integrally treated, that is, the effect that the interference portion can be accurately investigated and the machining amount can be accurately checked can be obtained without integrally treating the three-dimensional images. However, since data volume is increased when the data is acquired for the entire pipe to be attached and only the portion where the interference possibly occurs, that is, the axis of the linear portion is required, the method of generating the three-dimensional data of only the distal end portion is preferably employed.

In the present embodiment, the three-dimensional data of the distal end portions at both ends of the pipe to be attached are located on the coordinate system for the pipe to be attached, and the three-dimensional data of the distal end portions at both ends of the pipe to be attached are integrally moved by moving the coordinate system for the pipe to be attached. However, any method may be employed as long as the three-dimensional data of the distal end portions at both ends of the pipe to be attached are integrally moved. For example, the distal end portions at both ends of the pipe to be attached may be located on separate coordinate systems and the three-dimensional images of the distal end portions at both ends located on the separate coordinate systems may be correlated with each other to move one of the three-dimensional images when the other three-dimensional image is moved.

In the present embodiment, the pipe to be attached is translated and rotated by transforming the coordinate system for the pipe to be attached. However, the presently disclosed subject matter is not limited to the method of translating and rotating the entire coordinate system, but the position of the point group data may be translated and rotated according to the input amount of translation and rotation.

Although the location of the pipe to be attached is investigated by moving the coordinate system for the pipe to be attached in the present embodiment, the coordinate system for the pipes already installed may be also moved.

The presently disclosed subject matter is not limited to the pipe installation support apparatus, but may be also provided as a program to be applied to an apparatus such as the pipe installation support apparatus.

What is claimed is:

1. A pipe installation support apparatus comprising:
an acquiring device for acquiring, as point group data that is a group of point information, a three-dimensional measurement result regarding shapes of an end face of each of two pipes already installed in a facility and a section at any position of a linear portion adjacent to the end face, and shapes of each of end faces at both ends of a pipe to be attached for connecting the two pipes already installed and a section at any position of a linear portion adjacent to the end face;
a three-dimensional data generating device for generating three-dimensional data of the pipes already installed and the pipe to be attached, based on the point group data acquired by the acquiring device;
an image generating device for generating images of the pipes already installed and the pipe to be attached, based on the three-dimensional data of the pipes already installed and the pipe to be attached as generated by the three-dimensional data generating device;
a display control device for displaying the images of the pipes already installed and the pipe to be attached generated by the image generating device on a display device;
an input device for inputting a movement instruction to move at least one of the image of the pipes already installed and the image of the pipe to be attached as displayed on the display device by the display control device, to any position, or rotate at least one of the image of the pipes already installed and the image of the pipe to be attached by any angle;
a moving device for translating or rotating at least one of the three-dimensional data of the pipes already installed and the three-dimensional data of the pipe to be attached, based on the movement instruction when the movement instruction is input from the input device, wherein when the moving device translates or rotates the three-dimensional data, the display control device moves the images of the pipes already installed and the pipe to be attached displayed on the display device based on translation or rotation;
an interference investigating device for determining whether the three-dimensional data of each of the pipes already installed and the three-dimensional data of the pipe to be attached after being translated or rotated by the moving device, interfere with each other;
a machining amount calculating device for calculating, when the interference investigating device determines that the pipe to be attached and each of the pipes already installed interfere with each other, a length of an interference portion between the pipe to be attached and each of the pipes already installed, as a distance between evaluation points correlated with each other, the evaluation points which are obtained by searching for evaluation points at a closest distance from evaluation points placed on an end face of the pipes already installed at equal internals and from evaluation points placed on an end face of the pipe to be attached at equal intervals, and for calculating the length of the interference portion as a machining amount of the pipe to be attached; and
an output device for outputting the machining amount calculated by the machining amount calculating device to at least one of the display device and an external device.

2. The pipe installation support apparatus according to claim 1,
wherein the acquiring device acquires a relative positional relationship between both ends of the pipe to be attached,
the three-dimensional data generating device generates the three-dimensional data of both ends of the pipe to be attached based on the shapes of the end faces at both ends of the pipe to be attached and the section at any position of the linear portion adjacent to the end face, and locates the three-dimensional data of both ends of the pipe to be attached by reproducing the relative positional relationship thereof, and
the moving device combines the three-dimensional data of the pipe to be attached located by reproducing the relative positional relationship, and moves the combined three-dimensional data to any position or rotates the combined three-dimensional data by any angle.

3. The pipe installation support apparatus according to claim 1,
wherein the acquiring device acquires three-dimensional coordinates of the evaluation points on an outer periphery of the end face, as the three-dimensional measurement result regarding the shape of the end face.

4. The pipe installation support apparatus according to claim 1,
wherein the acquiring device emits a line laser beam to any position of the linear portion adjacent to the end face, and acquires three-dimensional coordinates of a plurality of points on a line obtained by emitting the line laser beam as the three-dimensional measurement result regarding the shape of the section at any position of the linear portion adjacent to the end face.

5. The pipe installation support apparatus according to claim 1,
wherein the image generating device generates three planar images by projecting the three-dimensional data of the pipes already installed and the three-dimensional data of the pipe to be attached in three directions perpendicular to each other, and
the display control device displays at least one of the three planar images generated by the image generating device on the display device.

6. The pipe installation support apparatus according to claim 1,
wherein the image generating device generates three-dimensional images of the pipes already installed and the pipe to be attached, based on the three-dimensional data of the pipes already installed and the pipe to be attached, and
the display control device displays the three-dimensional images of the pipes already installed and the pipe to be attached generated by the image generating device on the display device, in a superimposed manner.

7. A pipe installation support apparatus comprising:
an acquiring device for acquiring, as point group data that is a group of point information, a three-dimensional measurement result regarding shapes of an end face of each of two pipes already installed in a facility and a section at any position of a linear portion adjacent to the end face, and shapes of an end face of a pipe to be attached for connecting the two pipes already installed and a section of a pipe linear portion adjacent to the end face;

a three-dimensional data generating device for generating three-dimensional data including the shape of the end face and a direction of an axis with respect to each of the pipes already installed and the pipe to be attached, based on the point group data acquired by the acquiring device;

an automatic locating device for locating the three-dimensional data of the pipes already installed and the pipe to be attached at a position where the pipe to be attached most appropriately connects the two pipes already installed based on the direction of the axis of each of the pipes already installed and the direction of the axis of the pipe to be attached;

a machining amount calculating device for calculating a length of an interference portion between the three-dimensional data of each of the pipes already installed and the three-dimensional data of the pipe to be attached, as a machining amount of the pipe to be attached in a state in which the three-dimensional data of the pipes already installed and the pipe to be attached are located by the automatic locating device; and an output device for outputting the machining amount calculated by the machining amount calculating device to at least one of a display device and an external device.

8. The pipe installation support apparatus according to claim 7, wherein the three-dimensional data generating device calculates the direction of the axis of the pipes based on the shapes of the end face and the section of the pipe linear portion adjacent to the end face.

9. The pipe installation support apparatus according to claim 7, wherein the three-dimensional data generating device generates substantially circular data by connecting the point group data on each of the shape of the end face of each of the pipes already installed and the shape of the end face of the pipe to be attached, and locates an evaluation point on a circumference of each of the generated substantially circular data, and the machining amount calculating device calculates, as the machining amount, a distance between the evaluation point located on the circumference of the substantially circular data generated by connecting the point group data on the shape of the end face of each of the pipes already installed, and the evaluation point located on the circumference of the substantially circular data generated by connecting the point group data on the shape of the end face of the pipe to be attached.

10. The pipe installation support apparatus according to claim 7, wherein the automatic locating device comprises a determining device for determining that the three-dimensional data of the pipes already installed and the pipe to be attached are located at the position where the pipe to be attached most appropriately connects the two pipes already installed in a case where the axis of the pipe to be attached and the axes of the two pipes already installed are substantially aligned with each other, when a point where the end face of one of the pipes already installed intersects with the axis of the pipe already installed, and a point where a desired end face of the pipe to be attached intersects with the axis of the pipe to be attached, are aligned with each other.

11. The pipe installation support apparatus according to claim 7, wherein the automatic locating device comprises a determining device for determining that the three-dimensional data of the pipes already installed and the pipe to be attached are located at the position where the pipe to be attached most appropriately connects the two pipes already installed, in a case where the axis of the pipe to be attached intersects with each of the axes of the two pipes already installed, when a point where the end face of one of the pipes already installed intersects with the axis of the pipe already installed, and a point where a desired end face of the pipe to be attached intersects with the axis of the pipe to be attached, are aligned with each other.

12. The pipe installation support apparatus according to claim 10, wherein the automatic locating device comprises:

a moving device for translating at least one of the three-dimensional data of the pipes already installed and the three-dimensional data of the pipe to be attached by any distance, or rotating at least one of the three-dimensional data of the pipes already installed and the three-dimensional data of the pipe to be attached by any angle; and a control device for controlling the moving device to translate or rotate at least one of the three-dimensional data of the pipes already installed and the three-dimensional data of the pipe to be attached, when the determining device determines that the three-dimensional data of the pipes already installed and the pipe to be attached are not located at the position where the pipe to be attached most appropriately connects the two pipes already installed.

13. The pipe installation support apparatus according to claim 12, wherein the acquiring device acquires a relative positional relationship between both ends of the pipe to be attached, the three-dimensional data generating device locates the three-dimensional data including the shapes of the end faces at both ends of the pipe to be attached and the direction of the axis of the pipe to be attached by reproducing the acquired relative positional relationship between both ends, and the moving device integrally translates or rotates the three-dimensional data of both ends of the pipe to be attached located by reproducing the relative positional relationship between both ends.

14. The pipe installation support apparatus according to claim 7, further comprising an image generating device for generating three planar images by projecting the three-dimensional data of the pipes already installed and the three-dimensional data of the pipe to be attached in three directions perpendicular to each other, and/or generating three-dimensional images of the pipes already installed and the pipe to be attached based on the three-dimensional data of the pipes already installed and the pipe to be attached, and a display control device for displaying at least one of the three planar images on the display device, and/or displaying the three-dimensional images of the pipes already installed and the pipe to be attached on the display device in a superimposed manner.

15. A pipe installation support apparatus comprising:

an acquiring device for acquiring, as point group data that is a group of point information, a three-dimensional measured result regarding shapes of an end face of each of two pipes already installed in a facility and a section at any position of a linear portion adjacent to the end face, and shapes of each of end faces at both ends of a pipe to be attached for connecting the two pipes already installed and a section at any position of a linear portion adjacent to the end face;

a three-dimensional data generating device for generating three-dimensional data of the pipes already installed and the pipe to be attached, based on the point group data acquired by the acquiring device;

an image generating device for generating images of the pipes already installed and the pipe to be attached, based on the three-dimensional data of the pipes already installed and the pipe to be attached as generated by the three-dimensional data generating device;

a display control device for displaying the images of the pipes already installed and the pipe to be attached generated by the image generating device on a display device;

an input device for inputting a movement instruction to move at least one of the image of the pipes already installed and the image of the pipe to be attached as displayed on the display device by the display control device, to any position, or rotate at least one of the image of the pipes already installed and the image of the pipe to be attached by any angle;

a moving device for translating or rotating at least one of the three-dimensional data of the pipes already installed and the three-dimensional data of the pipe to be attached, based on the movement instruction when the movement instruction is input from the input device, wherein when the moving device translates or rotates the three-dimensional data, the display control device moves the images of the pipes already installed and the pipe to be attached displayed on the display device based on translation or rotation;

an interference investigating device for determining whether the three-dimensional data of each of the pipes already installed and the three-dimensional data of the pipe to be attached after being translated or rotated by the moving device, have portions interfering with each other;

a machining amount calculating device configured, when the interference investigating device determines that the pipe to be attached and a pipe already installed of the pipes already installed are interfering pipes having the portions interfering with each other, to use a predetermined plurality of evaluation points distributed on each of an end face of the pipe already installed and an end face of the pipe to be attached as the interfering pipes, to determine, for an interfering end of the pipe to be installed, lengths between closest evaluation points of the predetermined plurality of evaluation points on opposing end faces of the pipe already installed and the end face of the pipe to be attached, as machining amounts to be machined from the pipe to be attached; and an output device for outputting the machining amount calculated by the machining amount calculating device to at least one of the display device and an external device.

* * * * *